(No Model.)
W. H. McMULLEN.
PLOW ATTACHMENT.
No. 574,211. Patented Dec. 29, 1896.
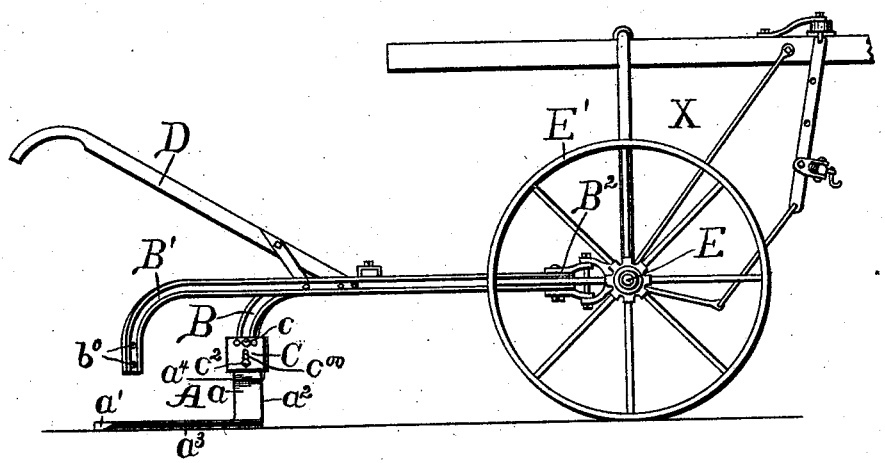
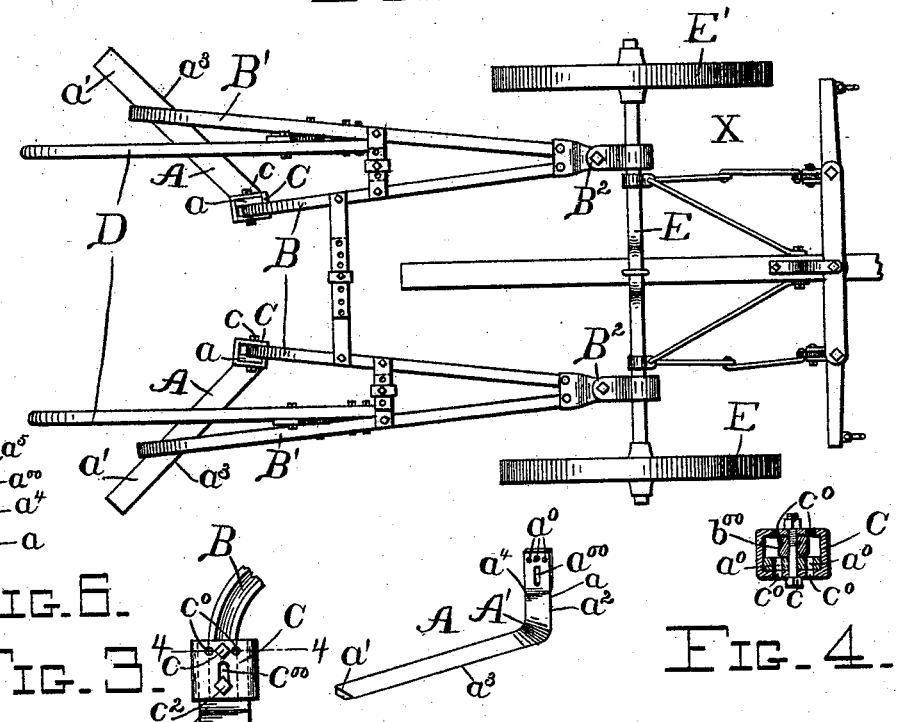
Witnesses
D. H. Blakelock
John Chalmers Wilson
Inventor
W. H. McMullen,
by Whitman & Wilkinson,
Attorneys.

UNITED STATES PATENT OFFICE.

WILBUR H. McMULLEN, OF LAFAYETTE, INDIANA.

PLOW ATTACHMENT.

SPECIFICATION forming part of Letters Patent No. 574,211, dated December 29, 1896.

Application filed July 1, 1896. Serial No. 597,764. (No model.)

*To all whom it may concern:*

Be it known that I, WILBUR H. McMULLEN, a citizen of the United States, residing at Lafayette, in the county of Tippecanoe and State of Indiana, have invented certain new and useful Improvements in Plow Attachments; and I do hereby declare the following to be a full, clear, and exact description of the invention, such as will enable others skilled in the art to which it appertains to make and use the same.

My invention relates to improvements in cultivator attachments; and it consists in the novel attachment and the means for connecting the same to a cultivator-plow hereinafter described and claimed.

My invention will be understood by reference to the accompanying drawings, wherein the same parts are indicated by the same letters throughout the several views.

Figure 1 is a side elevation of a straddle-row or double cultivator of a common form having the ordinary hoes or shovels detached and showing my improved attachments connected thereto. Fig. 2 is a top plan view of the same. Fig. 3 is a detail view showing in elevation the manner of attaching the cutters to the cultivator-feet. Fig. 4 is a horizontal section taken on the line 4 4 in Fig. 3. Fig. 5 is a detail perspective view of one of the knives. Fig. 6 is a rear elevation of a portion of the shank of the knife, showing how the upper end thereof is twisted to correspond with the cultivator-foot.

My attachment consists of a knife or cutter A, having a vertical shank $a$ and a horizontal arm $a'$. This knife or cutter is formed of a single piece of metal bent at A' in such a manner that the arm $a'$ will lie in a plane at right angles to the shank portion $a$, but will incline backward therefrom, as shown most clearly in Figs. 1 and 2. The vertical shank has a beveled cutting edge $a^2$ on its front edge, and the horizontal arm $a'$ has a similarly-beveled cutting edge $a^3$.

The upper end of the vertical shank $a$ is provided with a plurality of holes $a^0$ for the passage of a bolt for attaching the knife to the foot of the cultivator or plow and allowing of the adjustment thereof, as hereinafter more fully described. A vertical slot $a^{00}$ is also formed in this shank near its upper end for the passage of a second bolt for attaching the knife or cutter to the foot of the cultivator.

The vertical shank $a$ is bent or twisted, as at $a^4$, so that the upper end thereof may be flat against the side of the cultivator-foot and yet allow the lower portion, provided with the cutter edge, to lie in a vertical plane parallel to the line of movement of the plow, as shown most clearly in Fig. 6.

B B represent the inner beams, and B' B' represent the outer beams, of a common straddle-row or double cultivator X, and these beams are connected, as at B³ B², in pairs to the axle E, upon which wheels E' are mounted. The rear ends of these beams are bent to form the usual feet, to which the hoes or shovels are attached, and each of these feet has a pair of holes therethrough, as shown at $b^0$ in Fig. 1.

C represents a flat band or link having a plurality of holes $c^0$ through the opposite sides thereof near its upper edge and having vertical slots $c^{00}$ through its lower central portion.

The cutters A are attached to the cultivator in the following manner: The ordinary hoes or shovels being first removed from the cultivator-feet, the band C is slipped over either the foot of the beam B first or over the shank $a$ of the cutter, and the parts then fitted together, as shown in Fig. 3. A bolt $c$ is passed through one pair of the holes $c^0$ in the band C, and through the corresponding one of the holes $a^0$ in the upper end of the shank of the cutter, and through the upper hole $b^0$ in the foot of the beam B. This bolt is then secured by means of a nut in the ordinary way. Another bolt $c^2$ is then passed through the slots $c^{00}$ in the band, and through the slot $a^{00}$ in the shank of the cutter, and through the lower one of the holes $b^0$ in the foot of the beam B.

The inclination of the horizontal blade $a'$ is regulated by adjusting the upper bolt $c$ from one pair of the holes $c^0$ in the band C and one of the holes $a^0$ in the shank to another, as required, and the slots $c^{00}$ through the band and the slot $a^{00}$ through the shank of the cutter allow the cutter attachment to be readily connected to plow-feet in which the holes $b^0$ are made at varying distances apart, the said slots allowing the bolt $c^2$ to move vertically to engage the lower hole in the plow-foot, as will be obvious. Instead of the holes $a^0$ a slot $a^5$ (see Fig. 6) may be used, if preferred.

My improved cutters will always be attached to the front or inside feet of the cultivator, as shown, so that they may scrape the ground and cut the roots of the weeds near the row of corn, cotton, or whatever similar crop the cultivator is used in connection with, and at the same time be far enough forward to be out of the way of the plowman. The vertical cutting edge $a^2$ will cut any vines that may be growing along the row, and thus destroy such as would not be destroyed by the horizontal cutting edge $a^3$.

In use the cultivators may be steadied by means of the handles D.

Having thus described my invention, what I claim, and desire to secure by Letters Patent of the United States, is—

1. A vine and weed cutting attachment for cultivators consisting of a knife having a short vertical shank and a longer horizontal blade, sloping backward therefrom; a cutting edge on the front of said vertical portion, and a cutting edge on the front of said horizontal portion; the said vertical portion having a plurality of holes through its upper end, and a vertical slot therethrough near its upper end for the passage of bolts, substantially as and for the purposes described.

2. A vine and weed cutting attachment for cultivators consisting of the knife A having vertical portion $a$ with a plurality of holes $a^0$ through its upper end; and having horizontal portion $a'$ sloping backward from said vertical portion $a$; having beveled cutting edge $a^2$ on the front of said vertical portion, and similarly-beveled cutting edge $a^3$ on said horizontal portion forming together a continuous cutting edge, substantially as and for the purposes described.

3. In a vine and weed cutting attachment for cultivators, the combination with a knife having a vertical shank provided with a plurality of holes through its upper end and a vertical slot near said end, and provided with a cutting edge on the front thereof, and having a horizontal portion sloping backward from said vertical portion and also provided with a cutting edge on the front thereof; of a flat band having a plurality of coincident openings through opposite sides and a pair of slots also through its opposite sides, the said band being adapted to encircle the foot of the cultivator and the shank of the knife; and a pair of bolts, adapted to engage said slots and said openings, substantially as described.

4. In a vine and weed cutting attachment for cultivators, the combination with the knife A having vertical shank $a$ provided with a plurality of holes $a^0$ through its upper end and a vertical slot $a^{00}$ near said end, and having a horizontal portion sloping backward from said vertical portion, and integral therewith; and having vertical and horizontal cutting edges $a^2$ and $a^3$ forming a continuous cutting edge on the front thereof; of the flat band C having a plurality of openings $c^0$ through opposite sides thereof and vertical slots $c^{00}$ also through said opposite sides, and bolts $c$ and $c^2$ adapted to engage said openings $c^0$ and said slots $c^{00}$, substantially as described.

In testimony whereof I affix my signature in presence of two witnesses.

WILBUR H. McMULLEN.

Witnesses:
HENRY H. VINTON,
SAMUEL T. STALLARD.